July 7, 1970
R. F. KUDLEK
NOW BY CHANGE OF NAME R. F. NORDING
APPARATUS FOR VISUAL COLOR COMPARISON
3,519,360
Filed Oct. 22, 1965
3 Sheets-Sheet 1
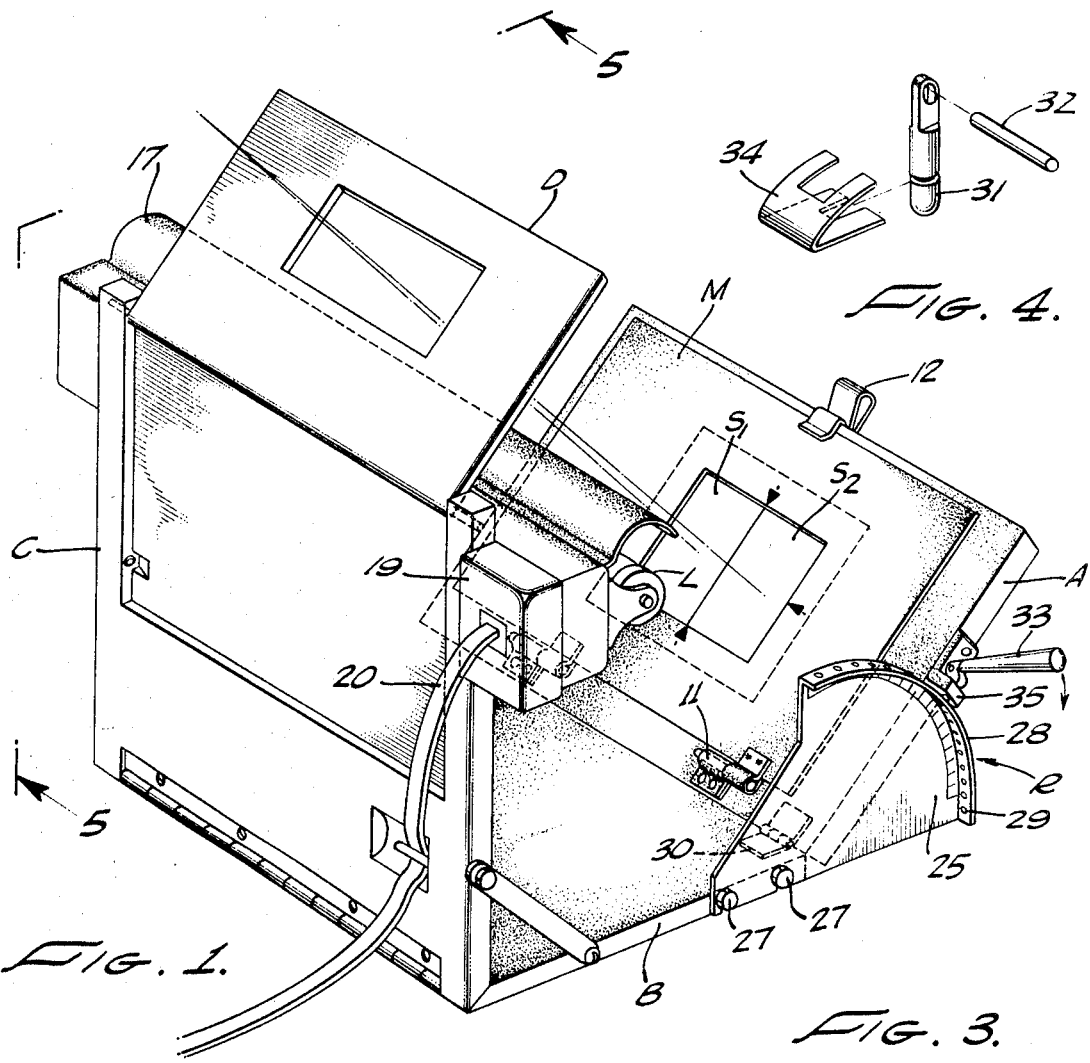
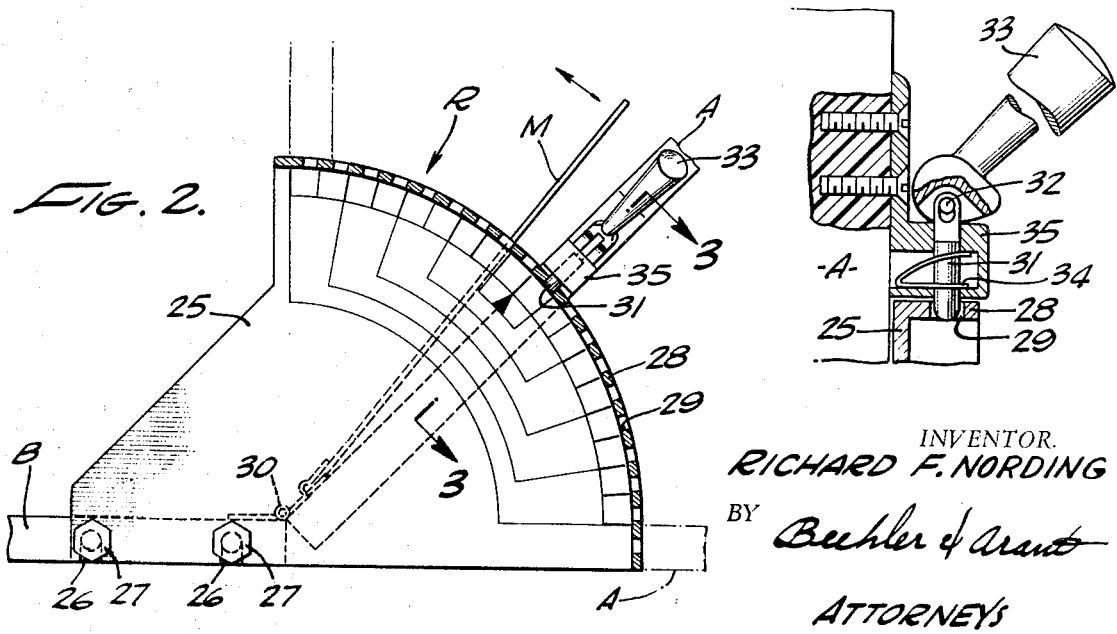
INVENTOR.
RICHARD F. NORDING
BY Buehler & Arant
ATTORNEYS

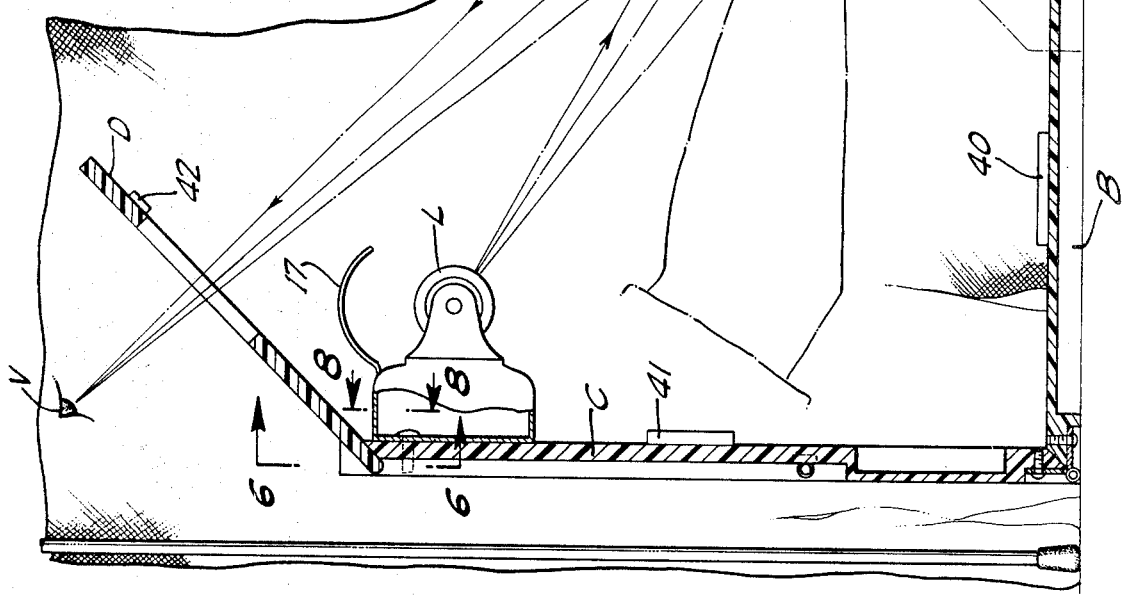

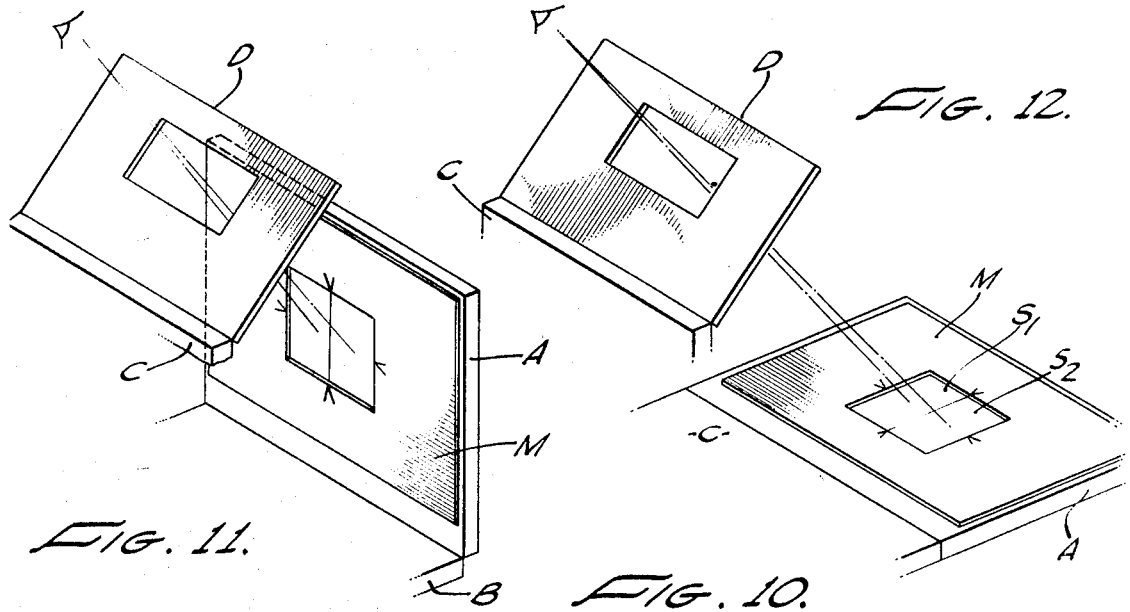
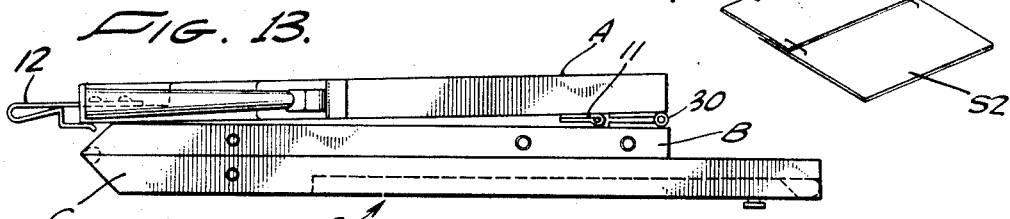
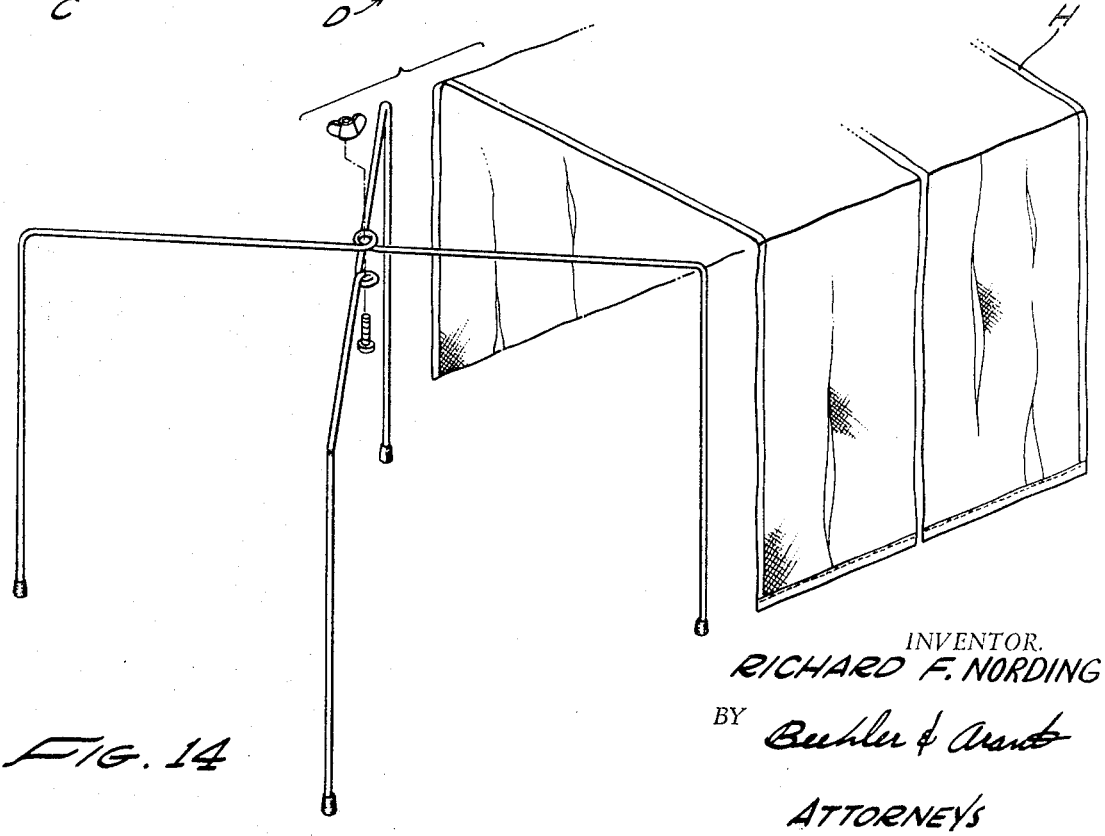

United States Patent Office 3,519,360
Patented July 7, 1970

3,519,360
APPARATUS FOR VISUAL COLOR COMPARISON
Richard F. Kudlek, now by change of name Richard F. Nording, c/o Vi-Cly Industries, 18414 S. Santa Fe Ave., Compton, Calif.
Filed Oct. 22, 1965, Ser. No. 500,951
Int. Cl. G01j 3/46
U.S. Cl. 356—195          7 Claims

ABSTRACT OF THE DISCLOSURE

A device for visual color comparison including a frame, a standard light source supported on the interior of one side of the frame, a shield member forming a peephole supported on the same side as the light source and above the light source, a shield on the light source preventing illumination passing from the light source to the peephole, a member having a flat surface for supporting in side-by-side relationship two color samples that are to be compared, this member being hinged to the frame so that its angular position can be changed relative to the light source and peephole, and a latch device for latching the member in any one of a number of different angular positions.

---

The present invention relates to two separate and independent phases of color comparison, namely: the color comparison of a glossy surface and a non-glossy surface; and measuring the quantitative effect of "flip-flop" as a function of the viewing angle for a single color sample.

The matching of colors is an inherently difficult process, because the color which is apparent to the eye is effectively a product of characteristics of the light source, the material being observed, and also the eye itself. It has heretofore been known to use an artificial light source, preferably one whose characteristics simulate natural daylight, in order to minimize the variable factors involved. A standard light source which is manufactured for this purpose at the present time is the "Ultra-Lux" fluorescent lamp, manufactured by the Nu-Lite Division of El-Tronics, Inc., Newark, N.J.

Particular difficulty has heretofore been encountered where one of the color samples being matched or compared has a non-glossy surface while the other has a glossy surface. For present purposes a glossy surface may be defined as one which is sensitive to light reflected from surrounding objects, and which has a shiny appearance. The accepted practice heretofore, in comparing glossy and non-glossy surfaces, has been to wet the non-glossy surface so that it appears glossy. Then the color comparison is made under a standardized light source by looking at two surfaces, both of which appear to be glossy.

According to the present invention the opposite approach is utilized. Means are employed to cause the glossy surface to appear non-glossy, and the color comparison is then made between two surfaces which appear non-glossy.

Another problem in color matching, completely unrelated to the matching of a glossy surface to a non-glossy surface, is that involving the so-called "flip-flop" which is an apparent change in color as a function of the viewing angle. Many painted surfaces have this characteristic, although it is generally undesirable. A paint which is of the highest quality will exhibit a very little apparent change in color throughout a change of 90° in the viewing angle. But a paint which is of poor quality will exhibit a very noticeable and significant change in apparent color as a result of a rather small change in the viewing angle. More specifically, the "flip-flop" tends to be evident when the viewing angle changes in the range from about 85° to about 95° (that is, between angles of about +5° and about −5° relative to a perpendicular viewing angle).

One primary object of the invention, therefore, is to provide a novel and accurate method of comparing a glossy color sample with a non-glossy color sample.

Another, essentially unrelated, primary object of the invention is to provide a method for quantitative measurement of the apparent "flip-flop" in a color sample as the viewing angle is changed.

A further object of the invention is to provide a method of comparing a glossy color sample with a non-glossy color sample, over a range of viewing angles.

An additional object of the invention is to provide an apparatus which is especially designed for comparing a glossy color sample with a non-glossy color sample.

Still another object of the invention is to provide an apparatus which is especially designed for quantitative measurement of "flip-flop" in a color sample being studied.

Yet a further object of the invention is to provide an apparatus for carrying out one or more of the foregoing objects, and which is inexpensive, and may easily be folded for portability.

The objects and advantages of the invention will be more fully understood from the following description considered in conjunction with the accompanying drawings, wherein:

FIG. 1 is a perspective view of the invention in operation;

FIG. 2 is a side view of the rotating mechanism;

FIG. 3 is a partial cross-sectional view taken on the line 3—3 of FIG. 2;

FIG. 4 is an exploded perspective view of a spring latch for the rotating mechanism;

FIG. 5 is a vertical cross-sectional view taken on the line 5—5 of FIG. 1;

FIG. 6 is a partially cut-away view taken on the line 6—6 of FIG. 5;

FIG. 7 is a cross-sectional view of hinge arrangement taken on the line 7—7 of FIG. 6;

FIG. 8 illustrates the detachable mounting for the light source;

FIG. 9 illustrates a quick release mechanism for the mask;

FIG. 10 shows color samples to be compared;

FIG. 11 is a diagrammatic view showing the vertical position of the color samples and mask;

FIG. 12 is a diagrammatic view showing the horizontal position of the color samples and mask;

FIG. 13 shows the main part of the mechanism when folded for transportation or storage; and FIG. 14 illustrates the hood.

Referring now to the drawings, in accordance with the present invention a pair of color samples S1 and S2 are preferably fastened together in side by side relationship as best shown in FIG. 10. The color samples are subjected to light from an artificial light source L, which is preferably a fluorescent lamp of the "Ultra-Lux" type, which simulates natural daylight. The samples S1 and S2 are then viewed by a viewing device, typically the human eye, indicated generally as V.

To this extent the color comparison method is, of course, old and well known.

According to the present invention an apparatus is utilized which provides certain conveniences, as well as facilitating the unique features of the novel method of color comparison in accordance with the invention. Among the convenience features of the mechanism are a definite place to position and support the color samples, means for supporting the light source, and a viewing slit for observation of the color samples by the viewing device. Other convenient features of the apparatus include the simplicity and relatively small expanse of the mechanism, and the fact that it may conveniently be folded for purposes of transportation or storage. Thus, generally, the apparatus includes a front plate or member A having a mask M associated therewith for retaining the color samples in place, a bottom plate or member B, a back plate or member C, and an upper or viewing plate or member D. Members A and B are hinged together so that the inner surface of member A (as seen in FIG. 5) can be folded over and upon the upper surface of member B (as seen in FIG. 5). Similarly, the associated edges of the members B and C are hinged together, so that the outer surface of member C (as seen in FIGS. 1 and 5) can be folded back upon the under surface of member B (as the member B is situated in FIGS. 1 and 5). Further, the lower edge of the upper or viewing member D is hinged to the upper edge of member C, and the latter is recessed on its outer surface so that the member D will fold into the recess. Thus the folded configuration of the basic framework of the apparatus is as shown in FIG. 13.

When the apparatus is in use the relative positions of the plates are best shown in FIG. 5, where it may be seen that the bottom plate B is horizontal, the back plate C is vertical, and the viewing plate D extends upwardly and forwardly from the top edge of back plate C at an angle of approximately 45°. The front plate A is adapted to be selectively rotated relative to the bottom plate B, although its average or normal position may be considered to be approximately that shown in FIG. 5, where it occupies an angle of about 45° from the horizontal, i.e. approximately parallel to the member D. FIG. 11 illustrates the extreme inner or vertical position of the member A while FIG. 12 illustrates the extreme outer or horizontal position of that member.

Other features of the general arrangement, best seen from FIGS. 1 and 5, are that the light source L is attached to the upper and inner surface of the back plate C, while a central viewing slit is formed in the viewing plate D. The mask M also has a rectangular viewing opening formed therein, and the color samples shown in FIG. 10 are preferably fastened together so that they may then be placed between the mask 10 and plate A in such manner that equal, perfectly rectangular areas of the two color samples are exposed to view through the viewing opening of the mask M. As is best seen in FIG. 1, the viewing slit of the viewing plate D, while being somewhat smaller than the opening in the mask M, is generally aligned with it.

The mask M is attached on its lower side by hinges 11 (see FIG. 5) to the inner surface of plate A, while the upper edge of mask M is retained by a quick release latch 12. As best seen in FIG. 9 the latch 12 has an elongated opening 13 formed therein, through which a screw 14 fastens the latch to the plate A. Merely by lifting the latch 12, it slides along the screw 14 on its groove 13, a sufficient distance to release the upper edge of the mask M. In this manner a pair of color samples can be quickly and conveniently inserted into or removed from the mask, and then the latch 12 is restored to its normal position for retaining the mask in place, so that the color samples are grasped in sandwich fashion between the mask and plate A.

The width of the plates A, B, C and D is typically about 13″, with the distance between the viewing plate D and the front plate A in the position shown in FIG. 5 being also approximately 13″. The light source L is then conveniently selected as a 18″ fluorescent tube, mounted from a standard frame, and attached to the upper inner surface of back plate C so that the ends of the lamp protrude somewhat beyond both sides of the back plate C. See FIG. 1. It is also essential that a reflector or shield 17 (see FIG. 5) be attached to the lamp base, in order to ensure that the viewing device V has no direct view of the light source, but only of the color samples being compared. As shown in FIG. 8 the lamp base is preferably supported from a pair of screws 18 in such manner that it may be conveniently lifted and separated from the back plate C, so as to permit the apparatus to be folded into the position shown in FIG. 13. A junction box 19 is attached to one end of the lamp base, as shown in FIG. 1, and receives the supply cord 20.

The apparatus of the present invention also includes rotating mechanism R, shown in FIGS. 1 to 4, which permits the front plate A and mask M to be selectively moved to various angular viewing positions. The rotating mechanism includes a side plate 25, best seen in FIG. 2, which on its lower edge has a pair of slots 26 which removably fit a pair of screws 27 carried on the side edge of bottom plate B. The upper portion of plate 25 is of arcuate form, and has an outwardly extending flange 28 whose radius center is substantially the axis of rotation of the hinge 30 which secures plates A and B together. The flange 28 has a series of slots or openings 29 formed therein, see FIGS. 1 and 3, which are selectively engaged by the latch. The latch includes a plunger 31, a plunger supporting pin 32, a release handle 33, and a retaining spring 34. In any one of these selected positions the lower end of the plunger 31 occupies an associated slot 29 of the flange 28, and the plunger is held down by the retaining spring 34 whose lower portion engages the annular groove of the plunger (best seen in FIG. 4) while its upper portion pushes upward on the latch frame 35. The latch frame 35 is in turn permanently fastened to the outer edge of front plate A. When it is desired to change the viewing angle, the release handle 33 is moved downward (as indicated by the arrow in FIG. 1) and this causes the plunger 31 to be pulled upward by its supporting pin 32. The operator then swings the front plate A either forward or backward, to another locking position, and permits the latch to again become fastened to one of the slots 29.

Another preferred although not indispensable feature of the invention is the hood H shown in FIG. 14. The apparatus is most conveniently placed on top of a table, and the hood H and its associated supporting frame are of a convenient size to rest upon the same table surface and completely enclose the sides of the apparatus shown in FIG. 1. Note in this connection that FIG. 5, while previously indicated as being a vertical cross-sectional view of FIG. 1, additionally shows the supporting legs for the hood H in the position that they occupy when the apparatus is in use.

In addition to the convenience features provided by the apparatus of the present invention, the rotating mechanism R makes possible a scientific approach to color comparison which has not been heretofore utilized. Thus, the front plate A is rotated through various selected positions, relative to the light source L and the viewing device V, so that the color comparison can be made under varying angles of incidence of the direct light from the light source, as well as for varying viewing angles by the viewing device. Practical experience has shown that rotating the position of the color samples in this fashion permits achieving a much more reliable and accurate color comparison than with the less sophisticated manner of simply looking at the samples in one particular position, as has been done heretofore.

Thus one significant feature of the novel method of the present invention involves the rotation of the color samples being compared, through a range of angles relative to both the light source and the viewing device.

Of greater significance, however, is the method in accordance with the present invention for achieving accurate comparison between a glossy color sample and a non-glossy color sample. The prior practice has been to wet the surface of the non-glossy sample in order to make it look glossy, and then perform a comparison. In accordance with the present invention steps are taken to cause the glossy sample to appear non-glossy, and then the comparison is made.

More specifically, in accordance with the method of the present invention, a shield having a non-glossy surface is positioned so as to substantially fully enclose the region around the color samples, light source, and viewing device. Thus the mask M is preferably a metal sheet, its exposed surface is painted with a flat black paint; the upper surface of the plate B (B being preferably a wooden member) is painted with a flat black paint and is then covered with a sheet member 40 which is preferably black velvet. In similar fashion the inner surface of member C (preferably a wooden member) is painted with a flat black paint, and is then covered with a sheet member 41 that is preferably black velvet. The inner surface of member D in like fashion is painted with flat black paint and covered with a sheet member 42, being black velvet. The hood H, FIG. 14, is also preferably black velvet. By utilizing an absorptive shield in this manner, to enclose the working area within which the color comparison is made, sources of reflected light are substantially eliminated. The result then is that the glossy color sample appears non-glossy.

While the use of black background having a flat surface, and preferably being black velvet sheet material, is preferred where the colors being compared are dark colors, it is not quite as effective in the situation where the colors being compared are relatively light colors. In that event it is preferred that the covering sheets 40, 41, and 42 be thin sheets of frosted Plexiglas, which are laid over the flat black painted surfaces of the wooden members B, C, and D. The Plexiglas has a light absorbing surface and substantially eliminates interfering light reflections which would otherwise appear on the glossy color sample, making its comparison to the non-glossy sample difficult or impossible.

As a matter of fact, the range of light colors with which the Plexiglas shields are preferred, is a wider range than the range of the dark colors with which the black velvet material is preferred. Thus in all cases the method of the present invention is to utilize a light absorbing shield which substantially encloses the working area, the shield being characterized by a surface which is flat in the color sense; and more specifically, over a limited range of dark colors it is preferred that the shield be an absolutely flat black material such as black velvet, while over a greater range of light colors it is preferred that the shield be a sheet of frosted Plexiglas material laid over a supporting surface having flat black paint covering on it.

In the rotating mechanism R of the illustrated apparatus the slots 29 are separated by fixed angular distances, preferably less than 5°. The various locking positions for the rotating mechanism may be numbered, or marked with degree markings, or in any other suitable manner. It then becomes possible to record the apparent changes in color of either a single sample, or a pair of color samples, in the various angular positions of the mechanism.

Obviously the apparatus of the present invention is suitable for comparing the apparent colors of a single color sample as a function of the viewing angle. The use of the apparatus is the same as previously described, and the front plate A is locked in various positions which particularly include the range of about 85° to about 95° relative to the viewing device. As previously mentioned, this is the area where "flip-flop" is particularly critical. When viewing a particular color sample the range of viewing angles may, of course, be increased as desired.

What is claimed as new is:

1. An apparatus for visual color comparison comprising, in combination:
    a member having a generally flat surface adapted to receive in side-by-side relationship two color samples which are to be compared;
    a frame;
    a light source supported from one side of said frame and so disposed as to transmit illumination directly to the other side of said frame;
    means supporting said member in a pivotal relationship to the other side of said frame so that the angular position of the color samples relative to said light source may be selectively varied;
    a shield member attached to said one side of said frame forming a peephole above said light source, said peephole being so disposed as to permit direct viewing of the color samples carried by said member;
    reflector means associated with said light source for directing the illumination toward the color samples and at the same time preventing any direct illumination from said light source to said peephole;
    and means for locking said member in a selected angular position relative to said light source and peephole.

2. Apparatus as claimed in claim 1 wherein said frame includes a generally flat horizontal member and a generally flat vertical member, the bottom of said vertical member being hingedly connected to the edge of said horizontal member at said one side of said frame, said color sample supporting member being hingedly connected to the other side of said horizontal frame member, and said light source being attached to the inner side of said vertical frame member near its upper end.

3. Apparatus as claimed in claim 2 wherein said color sample supporting member may be folded over on top of said horizontal frame member, and said vertical frame member may be folded over underneath said horizontal frame member, thereby to facilitate convenient transportation and handling of said device.

4. Apparatus as claimed in claim 3 wherein said shield is hingedly connected to the upper end of said vertical frame member, said vertical frame member having a hollow portion on its outer surface to permit the folding of said shield therein prior to the folding of said vertical frame member underneath said horizontal frame member.

5. Apparatus as claimed in claim 1 which includes a latching device having a plurality of separate latching locations corresponding to respective angular positions of said color sample supporting member.

6. Apparatus as claimed in claim 5 which includes a flat side plate disposed perpendicular to the plane of said horizontal frame member, said side plate having a generally pie-shaped configuration with its apex being secured to an outer end of said horizontal frame member, the arcuately curved end of said side plate lying at a fixed radius distance from the axis of pivoting of said color sample supporting member relative to said horizontal frame member; and which further includes a latching member carried on said color sample supporting member and cooperating with the curved end of said side plate for latching said color sample supporting member in a selected angular position.

7. Apparatus as claimed in claim 2 wherein the inner surfaces of said color sample supporting member, said horizontal frame member, and said vertical frame member, are covered with light absorbing material.

References Cited

UNITED STATES PATENTS

| | | |
|---|---|---|
| 120,224 | 10/1871 | Woodward _____ 350—140 X |
| 2,641,959 | 6/1953 | Verveen _____ 356—39 |
| 1,423,882 | 7/1922 | Radford. |
| 2,234,278 | 3/1941 | Richter. |
| 2,321,722 | 6/1943 | Zelony. |
| 2,325,350 | 7/1943 | West. |
| 2,388,727 | 11/1945 | Dench. |
| 2,502,014 | 3/1950 | Loggie. |
| 3,090,993 | 5/1963 | Tancig. |

(Other references on following page)

FOREIGN PATENTS 447,171 5/1936 Great Britain.
2,510 10/1853 Great Britain.

OTHER REFERENCES

"Tentative Method for Visual Evaluation of Color Differences of Opaque Materials, ASTM D–1729–60. T, ASTM Stds. vol. 9, pp. 891–896 (1961).

"Color in Plastics," and the cover photograph of the Rohm & Haas Reporter, vol. XVIII, No. 3, May–June 1960, pp. 8–11 and cover.

"Flock Paper Tube Lining," catalog, Edmund Scientific Company, 1963, p. 34.

Aminco-Scott Glossmeter (Goniophotometer), Bulletin 2115, May 1943, 3 pages—American Instrument Company, Silver Spring, Md.

RONALD L. WILBERT, Primary Examiner

R. J. WEBSTER, Assistant Examiner

U.S. Cl. X.R.

35—19.2; 350—140; 356—244